(12) United States Patent
Uchida et al.

(10) Patent No.: US 7,725,020 B2
(45) Date of Patent: May 25, 2010

(54) MONITORING CAMERA DEVICE

(75) Inventors: Tamotsu Uchida, Kanagawa (JP);
Kazutaka Higuchi, Kanagawa (JP);
Yasuji Nakamura, Kanagawa (JP); Koji Wakiyama, Kanagawa (JP); Joji Wada, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/375,620

(22) PCT Filed: Oct. 17, 2007

(86) PCT No.: PCT/JP2007/070227

§ 371 (c)(1),
(2), (4) Date: Jan. 29, 2009

(87) PCT Pub. No.: WO2008/053706

PCT Pub. Date: May 8, 2008

(65) Prior Publication Data

US 2009/0290860 A1    Nov. 26, 2009

(30) Foreign Application Priority Data

Oct. 30, 2006   (JP)   .............................. 2006-294195

(51) Int. Cl.
G02B 7/04        (2006.01)
G03B 17/00      (2006.01)
H04N 9/47       (2006.01)

(52) U.S. Cl. .................... 396/144; 396/427; 348/151

(58) Field of Classification Search .................. 396/144
See application file for complete search history.

(56) References Cited

U.S. PATENT DOCUMENTS 7,151,558 B1 * 12/2006 Kogane et al. .............. 348/151

FOREIGN PATENT DOCUMENTS

| JP | 2003-174572 A |   | 6/2003 |
|----|---------------|---|--------|
| JP | 2003-274229 A |   | 9/2003 |
| JP | 2003-295255 A |   | 10/2003 |
| JP | 2005-167922 A |   | 6/2005 |
| JP | 2006-148299 A |   | 6/2006 |
| JP | 2006-148421 A |   | 6/2006 |
| JP | 2008-111945   | * | 5/2008 |

OTHER PUBLICATIONS

International Search Report for PCT/JP2007/070227.

* cited by examiner

*Primary Examiner*—Melissa J Koval
(74) *Attorney, Agent, or Firm*—Pearne & Gordon LLP

(57) ABSTRACT

There is provided a monitoring camera apparatus which, while ensuring waterproofness, can perform focus adjustment when a dome cover is mounted. A lens (3) is covered by the dome cover (5) which is removable. A focus adjustment mechanism (9) moves an imaging device (7) in an optical axis direction and thereby performs focus adjustment. A setting button (13) being a focus setting operation unit is arranged in the inner side of the dome cover (5), and operated when the dome cover (5) is mounted. A controller (11) controls the focus adjustment mechanism (9). The controller (11) allows the focus adjustment mechanism (9) to start focus adjustment when a predetermined focus start wait time has elapsed after operation of the setting button (13). The focus start wait time is set according to a standard mounting operation time required to mount the dome cover (5).

4 Claims, 5 Drawing Sheets

MONITORING CAMERA DEVICE

CROSS REFERENCE TO RELATED APPLICATIONS

This application claims the benefit of Japanese Patent Applications No. 2006-294195 filed on Oct. 30, 2006 in Japan, the subject matter of which is hereby incorporated by reference.

TECHNICAL FIELD

The present invention relates to a monitoring camera apparatus, and more particularly to a focus adjustment function of a monitoring camera apparatus.

BACKGROUND ART

Monitoring camera apparatuses are widely used, and monitoring camera apparatuses not only for indoor use but also for outdoor use have been provided. Further, in addition to the conventional box-type monitoring camera apparatuses, domed monitoring camera apparatuses have recently been spreading.

The monitoring camera apparatus has a focus adjustment function of performing focus adjustment by moving the imaging device in an optical axis direction. Such focus adjustment performed by moving an imaging device is called "back-focus adjustment". A technique of automatically performing back-focus adjustment has also been proposed. This technique has been disclosed, for example, in Japanese Patent Laid-Open No. 2006-148299. Hereinafter, the automatic back-focus adjustment function is referred to as "focus adjustment function". The focus adjustment function reduces image blurring in the following scenes.

The monitoring camera apparatus, used day and night, has a function of automatically performing switching between a color mode for daytime and a monochrome mode for nighttime. This function is called "day and night function", for example. In the color mode for daytime, an infrared cutoff filter is placed in front of the imaging device. However, in the monochrome mode for nighttime, the infrared cutoff filter is removed, as a result, the average wavelength of incident light shifts. Further, in the case that infrared illumination is provided, the illumination wavelength also shifts. When the wavelength shifts, the focus position changes because of chromatic aberration of lens. Thus, in order to reduce the blurring caused by the focus position shift, focus adjustment is performed by the focus adjustment function at the time of mode switching.

The focus adjustment function is also useful in the installation operation and adjustment operation for the domed monitoring camera apparatus. In the domed monitoring camera apparatus, the lens is covered by a semispherical dome cover. For example, assume that the monitoring camera apparatus includes a varifocal lens (variable focus lens). In this case, in installing the camera, the zoom ring and focus ring of the exposed lens are manually turned with the dome cover removed, so that zoom (field angle) and focus adjustment are performed. When the adjustment operation is completed, the dome cover is mounted. In such case, since the semispherical dome cover has optical performance, the focus position may shift so that blurring occurs. Thus, in order to reduce such blurring, focus adjustment is performed by the focus adjustment function.

The focus adjustment function can be automatically started by using the filter removal as a trigger at the time of switching between the color mode and monochrome mode. However, at the time of mounting the dome cover, the focus adjustment function cannot be automatically started. Thus it is needed to provide a constitution for generating a trigger for starting the focus adjustment function at the time of mounting the dome cover.

To satisfy the above demand, the conventional monitoring camera apparatus includes an external switch on an external surface of housing for starting the focus adjustment function. The dome cover is mounted and then the external switch is operated, so that focus adjustment is performed. The reason for installing the switch on the external surface is that the switch must be operated after mounting the cover.

Further, a controller apparatus may be connected to the monitoring camera apparatus. In this case, a trigger for starting the focus adjustment function can be generated by using the controller. For example, a small-sized controller is connected via a cable to the monitoring camera apparatus. Then, a menu screen is opened on the controller, and an instruction for focus adjustment is inputted as a trigger.

In the conventional monitoring camera apparatus for indoor use not requiring waterproofness, the external switch for starting focus adjustment can be installed. However, in the monitoring camera apparatus for outdoor use, the external switch is disadvantageous for ensuring waterproofness. Further, the external switch is disadvantageous in terms of appearance. When the external switch cannot be installed, focus adjustment cannot be performed at the time of mounting the cover.

If the external controller apparatus described above can be connected, focus adjustment can be started without installing the external switch. However, generally, the external controller is provided for the user separately from the monitoring camera apparatus. Not all users have the external controller. It is rather appropriate to say that many users don't have the external controller. In view of the above, it is desirable that the monitoring camera apparatus achieve required functions while the external controller is not connected. Focus adjustment is included in such required functions. Thus, even in a case where the external controller can be connected to the monitoring camera apparatus, there is a need to provide a constitution for starting focus adjustment function without using the external controller.

The above described problem is noticeable for vandal-proof monitoring camera apparatuses. The vandal-proof monitoring camera apparatuses have robustness for protection against breakage. In this case, robustness is implemented by increasing the wall thickness of cover; and since a thick cover is provided, the variation in optical path length increases, so the above described problem becomes noticeable.

DISCLOSURE OF THE INVENTION

Problems to be Solved by the Invention

The present invention has been devised from the above background. An object of the present invention is to provide a monitoring camera apparatus which, while ensuring waterproofness, can perform focus adjustment when a dome cover is mounted.

Means for Solving the Problems

A monitoring camera apparatus according to the present invention includes: a lens; a removable dome cover which covers the lens; an imaging device which produces an image signal from an optical image formed by the lens; a focus adjustment mechanism which moves the imaging device in an optical axis direction and thereby performs focus adjustment; a focus setting operation unit which is arranged in the inner side of the dome cover and is operated when the dome cover is mounted; and a focus adjustment controller for controlling the focus adjustment mechanism, the focus adjustment controller allowing the focus adjustment mechanism to start focus adjustment when a predetermined focus start wait time has elapsed after operation of the focus setting operation unit, the predetermined focus start wait time being set according to a standard mounting operation time required to mount the dome cover.

As described hereafter, other aspects of the invention exist. Thus, this summary of the invention is intended to provide a few aspects of the invention and is not intended to limit the scope of the invention described and claimed herein.

Figure 1:
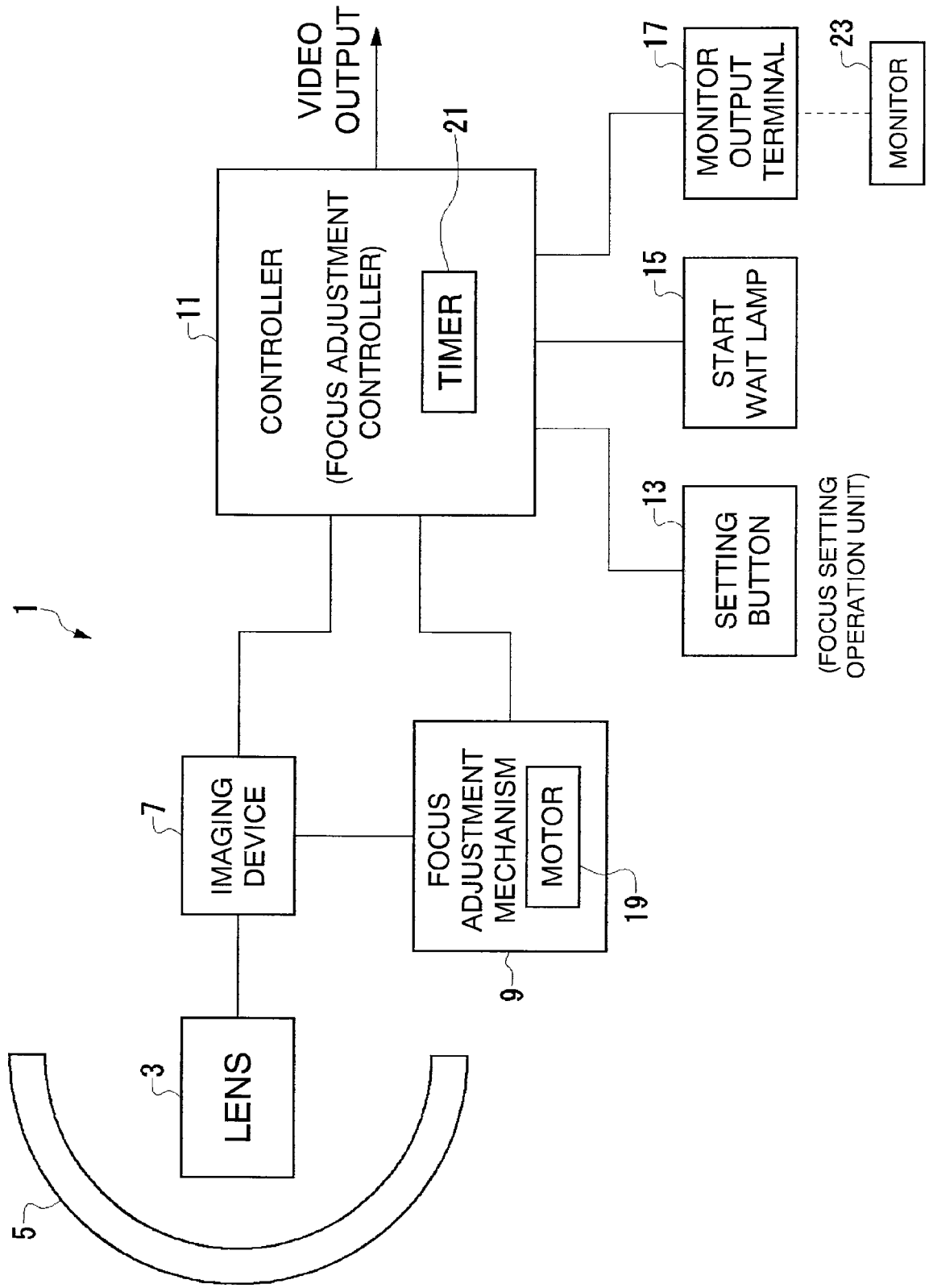
FIG. 1 is a block diagram of a monitoring camera apparatus according to an embodiment of the present invention.

DESCRIPTION OF SYMBOLS 1 monitoring camera apparatus
3 lens
5 dome cover
7 imaging device
9 focus adjustment mechanism
11 controller
13 setting button
15 start wait lamp
17 monitor output terminal
19 motor
21 timer

BEST MODE FOR CARRYING OUT THE INVENTION

A detailed explanation of the invention will be hereinafter described. The detailed explanation and the accompanying drawings do not limit the invention. Instead, the scope of the invention is limited by claims attached hereto.

The monitoring camera apparatus according to the present invention includes; a lens; a removable dome cover which covers the lens; an imaging device which produces an image signal from an optical image formed by the lens; a focus adjustment mechanism which moves the imaging device in an optical axis direction and thereby performs focus adjustment; a focus setting operation (manipulation) unit arranged in the inner side of the dome cover and operated (manipulated) when the dome cover is mounted or attached; and a focus adjustment controller for controlling the focus adjustment mechanism, the focus adjustment controller allowing the focus adjustment mechanism to start focus adjustment when a predetermined focus start wait time has elapsed after operation of the focus setting operation unit, the predetermined focus start wait time being set according to a standard mounting operation time required to mount or attach the dome cover.

According to this configuration, when the focus wait time has elapsed after operation of the focus setting operation unit, the focus adjustment function is started. Even though the focus setting operation unit is operated before mounting of the cover, focus adjustment can be started after mounting of the cover. Thus, even though the focus setting operation unit is disposed inside the cover, focus adjustment can start after mounting of the cover. Consequently, while ensuring waterproofness by arranging the focus setting operation unit in the inner side of the cover, focus adjustment can be performed when the dome cover is mounted.

The monitoring camera apparatus may include a start wait lamp which performs a start wait display indicating a focus adjustment start wait state; and the focus adjustment controller may cause the start wait lamp to display a start wait state until the focus start wait time has elapsed since the focus setting operation unit was operated.

According to this configuration, the start wait display by the start wait lamp can notify the focus adjustment start wait state to the operator. When the focus start wait time has elapsed after operation of the focus setting operation unit, the start wait display is terminated. This allows the operator to perceive whether or not the cover has been mounted before the focus adjustment function starts.

The dome cover may be a vandal-proof cover. According to this configuration, in the monitoring camera apparatus having a thick vandal-proof cover with which a relatively large variation of optical path length occurs, focus adjustment can reduce blurring properly.

The monitoring camera apparatus may include an operation generating unit. The operation generating unit may be disposed at a place which comes into contact with the focus setting operation unit when the dome cover is mounted and may contact with the focus setting operation unit to perform an operating motion to the focus setting operation unit. According to this configuration, there is no need to manually operate the focus setting operation unit, thus simplifying the operation.

As described above, according to the present invention, the focus setting operation unit is disposed inside the cover, and when the focus wait time has elapsed after operation of the focus setting operation unit, the focus adjustment function is started. Consequently, while ensuring waterproofness, focus adjustment can be performed when the dome cover is mounted.

The monitoring camera apparatus according to the embodiment of the present invention will be described below with reference to the drawings.

FIG. 1 shows the monitoring camera apparatus according to the embodiment of the present invention. Referring to FIG. 1, the monitoring camera apparatus 1 includes a lens 3, removable dome cover 5 which covers the lens 3, imaging device 7, focus adjustment mechanism which moves the imaging device 7 in an optical axis direction, controller 11 which controls the whole camera and also functions as the focus adjustment controller of the present invention, setting button 13 operated by the operator for focus adjustment, start wait lamp 15 which displays the state of focus adjustment function, and monitor output terminal 17.

In the above configuration, the lens 3 is a varifocal lens (variable focus lens). With the lens 3, zoom (field angle) and focus adjustment are performed manually. A pan mechanism and tilt mechanism are also provided. The imaging device (element) 7 is composed of CCD or CMOS, for example. The lens 3 and imaging device 7 capture a subject through the dome cover 5. The lens 3 forms a subject optical image on the imaging surface of the imaging device 7; and the imaging device 7 produces an electrical image signal from the optical image.

The focus adjustment mechanism 9 includes a motor 19, and the power of the motor 19 moves the imaging device 7 in an optical axis direction, whereby back-focus adjustment is performed. An exemplary configuration of the focus adjustment mechanism 9 will be described later.

The controller (control unit) 11, constituted of a microcomputer, controls the whole camera. The controller 11 receives an image signal from the imaging device 7. Then, the image signal is outputted as a video output signal to the outside. For example, the video signal is sent to a distant supervision room.

The controller 11 controls the focus adjustment mechanism 9 and thereby functions as the focus adjustment controller of the present invention. According to the present embodiment, passive focus adjustment is performed based on the image signal. The controller 11 controls the focus adjustment mechanism 9 to move the imaging device 7, and detects the change of focus state from the image signal. The controller 11 stops the imaging device at a position where the focus is optimally adjusted. The focus state is determined, for example, based on the magnitude of high frequency components of the image signal. In this way, according to the present embodiment, back-focus adjustment is automatically performed.

The setting button 13 corresponds to the focus setting operation unit of the present invention. The setting button 13 is operated by the operator to start the focus adjustment function. The setting button 13 is, as described later, arranged in the inner side of the dome cover 5. In performing focus adjustment, the operator depresses the setting button 13, and then the dome cover 5 is mounted, so that the setting button 13 is covered by the dome cover 5.

When the setting button 13 is depressed, a button operation signal is inputted as a trigger signal for focus adjustment to the controller 11. The controller 11 performs focus adjustment in response to the trigger signal. Here, according to the present embodiment, the controller 11 does not start focus adjustment immediately after receiving the button operation trigger signal. The controller 11 includes a timer 21. The controller 11 starts focus adjustment when a predetermined focus start wait time has elapsed after the button operation.

The focus start wait time is set according to a standard operating time required to mount the dome cover 5. To be more in detail, a time obtained by adding an appropriate margin time to the standard operating time is preliminarily set as the focus start wait time. This focus start wait time is prestored as part of a control program into the controller 11, and used for the control processing by the controller 11.

The start wait lamp 15 is constituted of LED, and controlled by the controller 11 to glow. The start wait lamp 15 performs a start wait display indicating a focus adjustment start wait state. The controller 11 allows the start wait lamp 15 to perform the start wait display until the focus start wait time has elapsed after the setting button 13 being the focus setting operation unit was operated. More specifically, the controller 11 allows the start wait lamp 15 to blink. The LED of the start wait lamp 15 may be used for display of states other than start wait.

Connected to the monitor output terminal 17 is a monitor 23. The monitor 23 is a small-sized monitor for camera installation operation or adjustment operation, and carried by the operator. The operator connects the monitor 23 to the monitor output terminal 17. While viewing the monitor image, the operator performs the adjustment operation for the lens 3. As the adjustment operation, pan angle adjustment, tilt angle adjustment, zoom adjustment and focus adjustment are performed.

Aside from at the time of operating the setting button 13, focus adjustment is also performed at the time of performing switching between a color mode for daytime and a monochrome mode for nighttime. Though not illustrated in FIG. 1, an infrared cut filter is provided in front of the imaging device 7. The infrared cut filter is moved by a filter moving mechanism. When switching is performed from the monochrome mode to the color mode, the filter is inserted on the optical axis; when switching is performed from the color mode to the monochrome mode, the filter is removed from the optical axis. When this filter switching is performed, the focus position shifts. Thus, the controller 11 performs focus adjustment by using the filter switching as a trigger.

Figure 2:
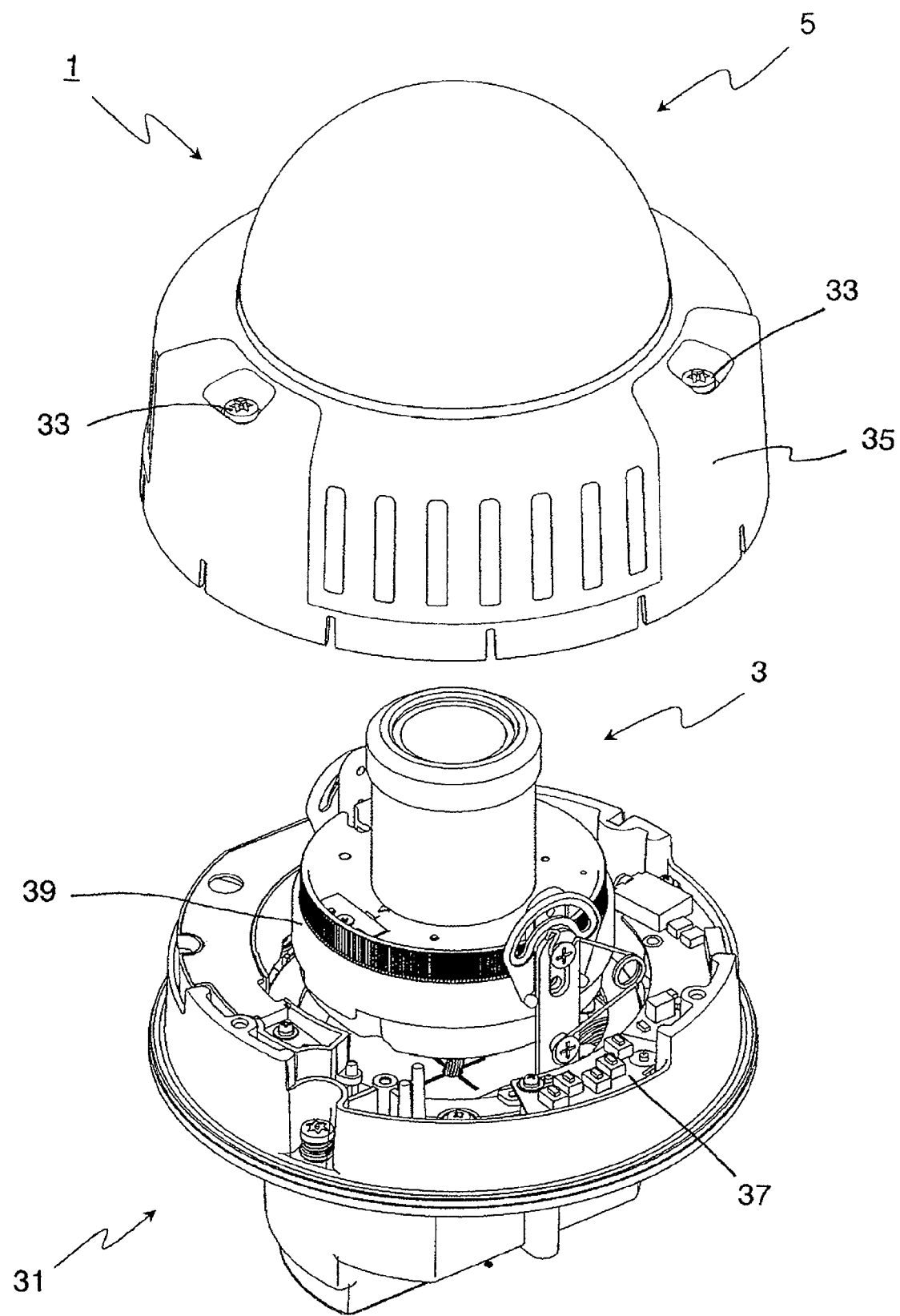
FIG. 2 is an exploded perspective view of the monitoring camera apparatus according to the embodiment of the present invention.

FIG. 2 is an exploded perspective view of the monitoring camera apparatus 1 with the dome cover 5 removed. The lens 3 is arranged in a base unit 31. The lens 3 is arranged so that its pan angle and tilt angle can be adjusted. Further, the lens 3 is a varifocal lens (variable focus lens), and includes a zoom ring and focus ring. These rings are manually turned, so that zoom (field angle) and focus adjustment are performed.

The dome cover 5 is attached to the base unit 31 to cover the lens 3. The dome cover 5 is a transparent or semi-transparent cover having a semispherical shape. According to the present embodiment, the dome cover 5 is a vandal-proof, thick cover which is hard to break. Preferably, the internal diameter of dome is 105 mm, and the cover wall thickness is 3.5 mm, for example.

Referring to FIG. 2, the dome cover 5 is illustrated in the upper side. However, in installing the monitoring camera apparatus, the base unit 31 may be arranged in the upper side, the vertex of the dome cover 5 facing downward. In this case, the posture of the monitoring camera apparatus 1 is upside down relative to FIG. 2.

The dome cover 5 is attached to the base unit 31 with three fixing screws 33. To be more in detail, the dome cover 5 is integrated with a housing 35 which surrounds the dome cover 5. The housing 35 is attached to the base unit 31 with three fixing screws 33, whereby the dome cover 5 is mounted. According to the present embodiment, the monitoring camera apparatus 1 is for outdoor use. The dome cover 5 is configured so as to ensure the waterproofness of the monitoring camera apparatus 1 when the dome cover 5 with the housing 35 is attached to the base unit 31. In the present specification, the structure including the housing 35 is referred to as a dome cover 5.

The focus start wait time mentioned above is set according to a standard operating time required to mount the dome cover 5. This standard operating time is a time required to cover the base unit 31 with the dome cover 5 at a predetermined position and then secure the dome cover 5 with the fixing screws 33. In this case, preferably, the focus start wait time is three minutes, for example.

Further, as illustrated in FIG. 2, in the base unit 31, there is mounted a switch board 37. The switch board 37 is disposed beside the lens 3. The switch board 37 is connected to a microcomputer being a controller. The microcomputer (not illustrated) is arranged inside a cylinder 39 in the rear of the lens 3.

Figure 3:
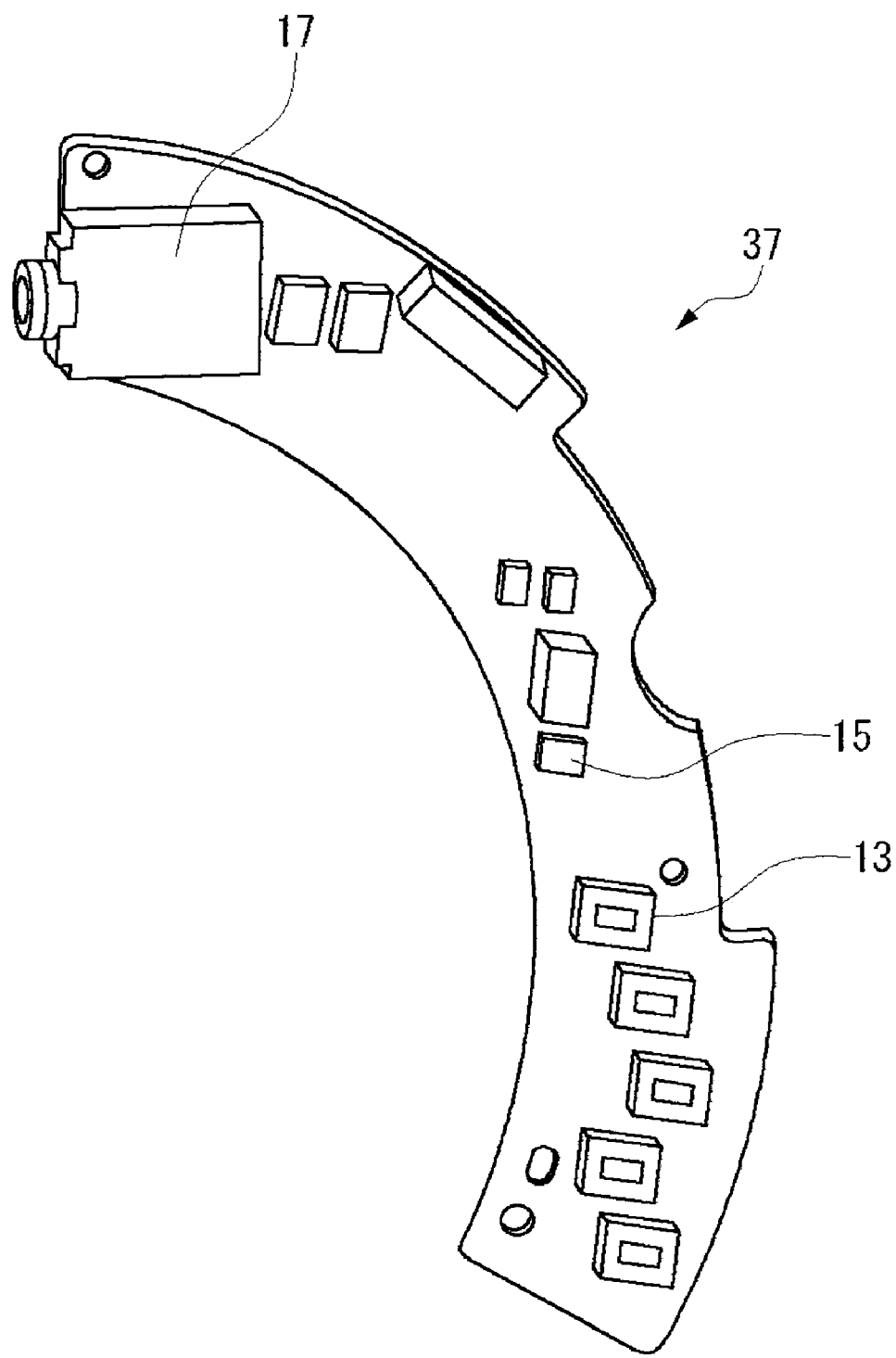
FIG. 3 is a view illustrating a switch board having mounted thereon a setting button.

As illustrated in FIG. 3, the setting button 13, start wait lamp 15 and monitor output terminal 17 are arranged on the switch board 37. The setting button 13 is constituted of a push-type switch. The setting button 13 is mounted on the switch board 37 in a manner neighboring several other buttons. The start wait lamp 15 is an LED and mounted in the vicinity of the setting button 13. The monitor output terminal 17 is, as described above, a terminal connected to the monitor. The adjustment of pan angle, tilt angle, zoom, focus and the like is performed while an image on the monitor is viewed.

The switch board 37 is disposed in the inner side of the dome cover 5. Consequently, when the dome cover 5 is mounted, the switch board 37 is covered by the dome cover 5 along with the lens 3. The setting button 13, start wait lamp 15 and monitor output terminal 17 are also covered by the dome cover 5. In this way, according to the present embodiment, waterproofness is ensured for the operated members used for starting focus adjustment.

Figure 4:
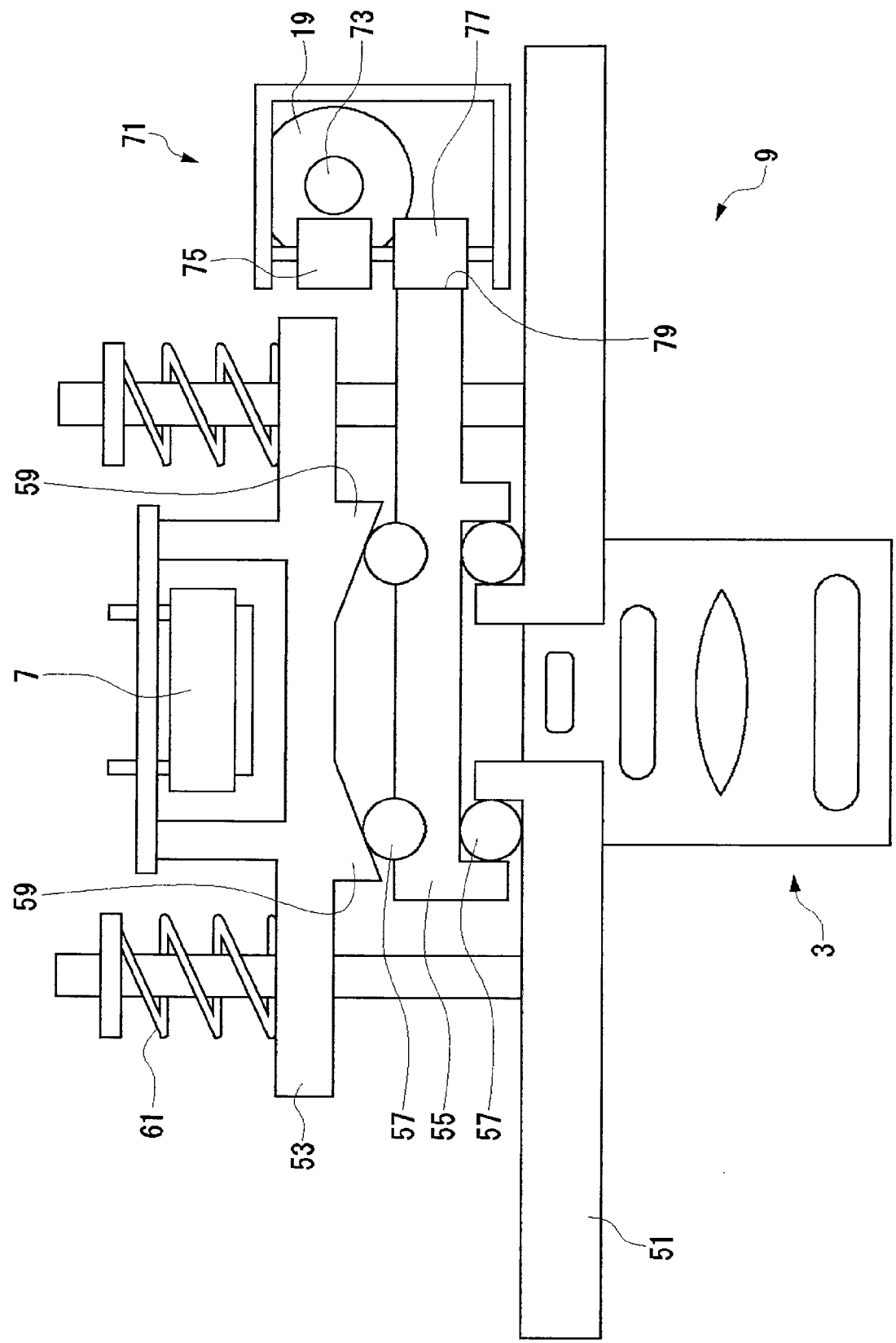
FIG. 4 is a view illustrating a focus adjustment mechanism of the monitoring camera apparatus.

FIG. 4 schematically illustrates the focus adjustment mechanism 9. Referring to FIG. 4, the lens 3 is arranged in a lens mount 51 being a fixed part. The imaging device 7 is arranged in a cam base 53 being a moving part. The fixed part and moving part refer to a stationary member and moving member in the focus adjustment mechanism. The fixed part and moving part together, as a part of the whole monitoring camera apparatus 1, may be rotated in a pan direction or in a tilt direction.

An intermediate board 55 is sandwiched in between the lens mount 51 and cam base 53. Steel balls 57 are sandwiched in between the intermediate board 55 and lens mount 51. Steel balls 57 are also sandwiched in between the intermediate board 55 and cam base 53. The steel balls 57 are in contact with a cam 59 of the cam base 53. The cam 59 is a spiral cam and has spiral inclined planes the height of which vary along a circle around the optical axis. This inclined planes correspond to the cam surfaces, and the steel balls 57 are in contact with the cam surfaces. Biasing springs 61 urge the cam base 53 against the lens mount 51.

The cam base 53 cannot rotate, but is movable in an optical axis direction. Consequently, when the intermediate board 55 rotates, the cam moves relative to the steel balls 57, and the cam base 53 moves in an optical axis direction, and the imaging device 7 also moves in an optical axis direction.

The intermediate board 55 is rotated by a motor 19. The motor 19 is a stepping motor. A reduction mechanism 71 is provided to transmit the rotation of the motor 19 to the intermediate board 55. In the reduction mechanism 71, a motor gear 73 engages with a first gear 75. The first gear 75 and a second gear 77 are mounted on the same shaft. The second gear 77 engages with a large-diameter gear 79 arranged in the outer circumference of the intermediate board 55. The motor gear 73 is a worm gear; and the first gear 75 is a helical gear. Rotation direction is converted by these gears. The second gear 77 and large-diameter gear 79 are each a spur gear. When the motor 19 rotates, the motor rotation is transmitted to the intermediate board 55 by these gears, so that the intermediate board 55 rotates and the imaging device 7 is moved by the cam mechanism.

The reduction ratio of the reduction mechanism 71 is set in the following way, for example. The reduction ratio between the motor gear 73 and first gear 75 is set to 1/18, and the reduction ratio between the second gear 77 and large-diameter gear 79 is set to 18/145. Thus the overall reduction ratio is set to 1/145.

The above description is about the configuration of the monitoring camera apparatus 1 according to the present embodiment. The operation of the monitoring camera apparatus 1 will be described. First the adjustment operation performed in a camera installation work or the like will be briefly described, and then the focus adjustment start operation by which the present embodiment is characterized will be described.

In the camera installation work, the base unit 31 is secured to a camera installation place in the condition that the dome cover 5 is removed. Then, the adjustment operation of lens 3 is performed with the cover removed. In the adjustment operation, the monitor 23 is connected to the monitor output terminal 17. Viewing an image on the monitor, the pan mechanism and the tilt mechanism are operated to adjust the pan angle and tilt angle. After the adjustment, the pan mechanism and the tilt mechanism are locked. Further, in the adjustment operation, the zoom ring and focus ring are also operated to perform zoom (field angle) and focus adjustment. This adjustment operation is also performed while viewing an image on the monitor. Then, the zoom ring and focus ring are locked.

After these operations, the monitor 23 is disconnected from the monitor output terminal 17, and the dome cover 5 is mounted over the lens 3 and secured to the base unit 31 with the fixing screws 33. At this operation, before mounting the dome cover 5, the setting button 13 is depressed. That is, after depressing the setting button 13, the dome cover 5 is mounted. When the setting button 13 is depressed, the controller 11 performs focus adjustment in the following way.

Figure 5:
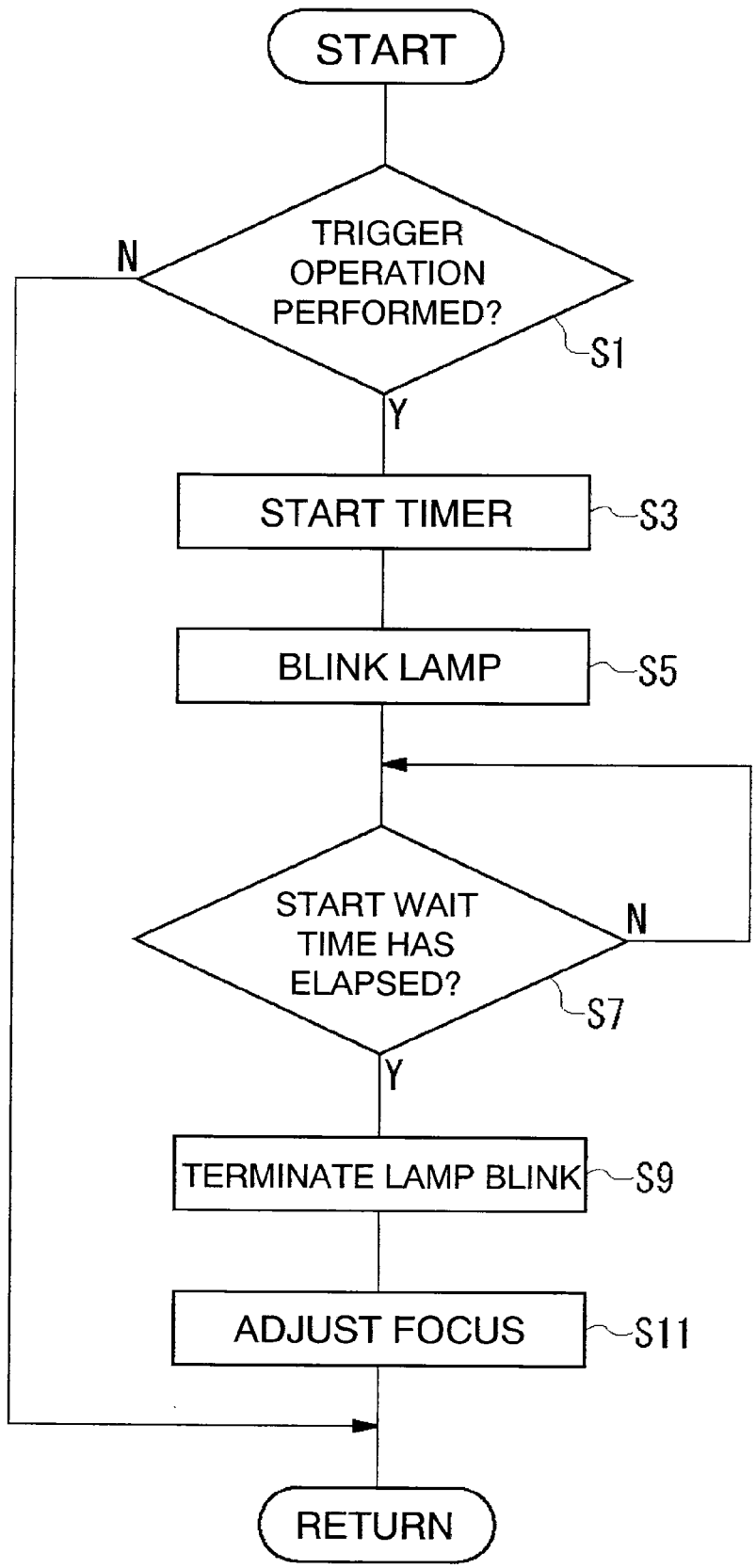
FIG. 5 is a flowchart for explaining the operation of the monitoring camera apparatus according to the embodiment of the present invention.

FIG. 5 illustrates the focus adjustment operation by the controller 11. The controller 11 determines whether or not the trigger operation has been performed (S1). When the setting button 13 is depressed, the controller determines that the trigger operation has been performed. When the setting button 13 is not depressed, it is determined NO in step S1 and the operation returns.

When the setting button 13 is depressed, it is determined YES in step S1, and the controller 11 starts time count using the timer 21 (S3). Also, the controller controls the start wait lamp 15 so that the lamp starts to blink (S5). This blinking corresponds to a start wait display indicating a focus adjustment start wait state.

The controller 11 determines whether or not the elapsed time after the timer start has reached the focus start wait time (S7). If the focus start wait time has not elapsed, the determination of S7 goes on. If the focus start wait time has elapsed, the controller 11 terminates the blinking of the start wait lamp 15 (S9), and performs focus adjustment (S11). In the focus adjustment, the controller 11 allows the motor 19 to rotate, so that the imaging device 7 moves. Then, the controller 11 detects a variation in image signal, and when optimum focus adjustment is achieved, stops the motor 19, so that the imaging device 7 stops at that position. After the focus adjustment, the operation returns.

The above description is about the operation of the monitoring camera apparatus 1. Exemplary applications or variation of the present embodiment will be described. According to the above embodiment, the operator manually operates the setting button 13 which is the focus setting operation unit. However, the monitoring camera apparatus 1 may include, as described below, an operation generating unit, so that the focus setting operation unit is operated by the operation generating unit. The operation generating unit is disposed at a place which come into contact with the focus setting operation unit when the dome cover 5 is mounted. The operation generating unit is a member which comes into contact with the focus setting operation unit and thereby performs an operating motion to the focus setting operation unit.

For example, the focus setting operation unit is a push button similar to the setting button 13; and the operation generating unit is a protrusion provided on the dome cover 5. To be more in detail, the operation generating unit may be a protrusion arranged in the inner surface of the housing in the periphery of the dome cover 5. When the dome cover 5 is mounted, the protrusion comes into contact with the push switch and pushes the push switch. As a result, the push switch changes to the operating state. Alternatively, the operation generating unit may be implemented by a cover fixing screw. In this case, the push switch is depressed by the cover fixing screw, so that the push switch changes to the operating state.

In this way, since the operation generating unit is provided, focus adjustment is automatically performed without the operator manually operating the focus setting operation unit, thus facilitating the operation.

The monitoring camera apparatus 1 according to the embodiment of the present invention has been explained above. According to the present embodiment, after the setting button 13 being the focus setting operation unit is operated and the focus wait time has then elapsed, the focus adjustment function starts. Consequently, in spite of that the focus setting operation unit is operated before mounting the cover, focus adjustment can be started after mounting the cover. Accordingly, in spite of that the focus setting operation unit is disposed in the inner side of the cover, focus start-up is possible after mounting the cover. Thus while the focus setting operation unit is arranged in the inner side of the cover to ensure waterproofness, focus adjustment is possible when the dome cover is mounted.

According to the present embodiment, the start wait lamp 15 is provided. The controller 11 allows the start wait lamp 15 to perform a start wait display until the focus start wait time has elapsed after operation of the focus setting operation unit. Accordingly, the focus adjustment start wait state can be notified to the operator. When the focus start wait time has elapsed after operation of the focus setting operation unit, the start wait display terminates. Consequently, it is possible to make the operator perceive whether or not the cover has been mounted before the focus adjustment function starts.

According to the present embodiment, the dome cover 5 is a vandal-proof cover. Accordingly, in the monitoring camera apparatus 1 provided with a thick vandal-proof cover with which a relatively large variation of optical path length occurs, focus adjustment can reduce blurring properly.

According to the present embodiment, the operation generating unit is, as described above, provided at a place which comes into contact with the focus setting operation unit when the dome cover 5 is mounted. When coming into contact with the focus setting operation unit, the operation generating unit may perform an operating motion to the focus setting operation unit. Accordingly, there is no need to manually operate the focus setting operation unit, thus simplifying the operation.

While there has been described what is at present considered to be a preferred embodiment of the invention, it will be understood that various modifications and variations may be made thereto, and it is intended that appended claims cover all such modifications and variations as fall within the true spirit and scope of the invention.

INDUSTRIAL APPLICABILITY

As described above, the monitoring camera apparatus according to the present invention includes the focus setting operation unit in the inner side of the dome cover, and the focus adjustment function is started when the focus wait time has elapsed after operation of the focus setting operation unit. Consequently, while waterproofness is ensured, focus adjustment can be performed when the dome cover is mounted. The present invention is useful for a monitoring camera for outdoor use and other applications.

The invention claimed is:

1. A monitoring camera apparatus comprising:
   a lens;
   a removable dome cover which covers the lens;
   an imaging device which produces an image signal from an optical image formed by the lens;
   a focus adjustment mechanism which moves the imaging device in an optical axis direction and thereby performs focus adjustment;
   a focus setting operation unit which is arranged in the inner side of the dome cover and is operated when the dome cover is mounted; and
   a focus adjustment controller for controlling the focus adjustment mechanism, the focus adjustment controller allowing the focus adjustment mechanism to start focus adjustment when a predetermined focus start wait time has elapsed after operation of the focus setting operation unit, the predetermined focus start wait time being set according to a standard mounting operation time required to mount the dome cover.

2. The monitoring camera apparatus according to claim 1, further comprising a start wait lamp which performs a start wait display indicating a focus adjustment start wait state, wherein the focus adjustment controller allows the start wait lamp to perform the start wait display until the focus start wait time has elapsed after operation of the focus setting operation unit.

3. The monitoring camera apparatus according to claim 1, wherein the dome cover is a vandal-proof cover.

4. The monitoring camera apparatus according to claim 1, further comprising an operation generating unit which is disposed at a place which comes into contact with the focus setting operation unit when the dome cover is mounted, the operation generating unit contacting with the focus setting operation unit to perform an operating motion to the focus setting operation unit.

* * * * *

UNITED STATES PATENT AND TRADEMARK OFFICE
CERTIFICATE OF CORRECTION

PATENT NO.        : 7,725,020 B2
APPLICATION NO.   : 12/375620
DATED             : May 25, 2010
INVENTOR(S)       : Tamotsu Uchida et al.

It is certified that error appears in the above-identified patent and that said Letters Patent is hereby corrected as shown below:

In column 4, line 57, please insert the number --9-- after the word "mechanism" and before the word "which", In column 8, line 28, please insert the number --11-- after the word "controller" and before the word "determines".

Signed and Sealed this

Twenty-first Day of December, 2010

David J. Kappos
*Director of the United States Patent and Trademark Office*